Figure 1:
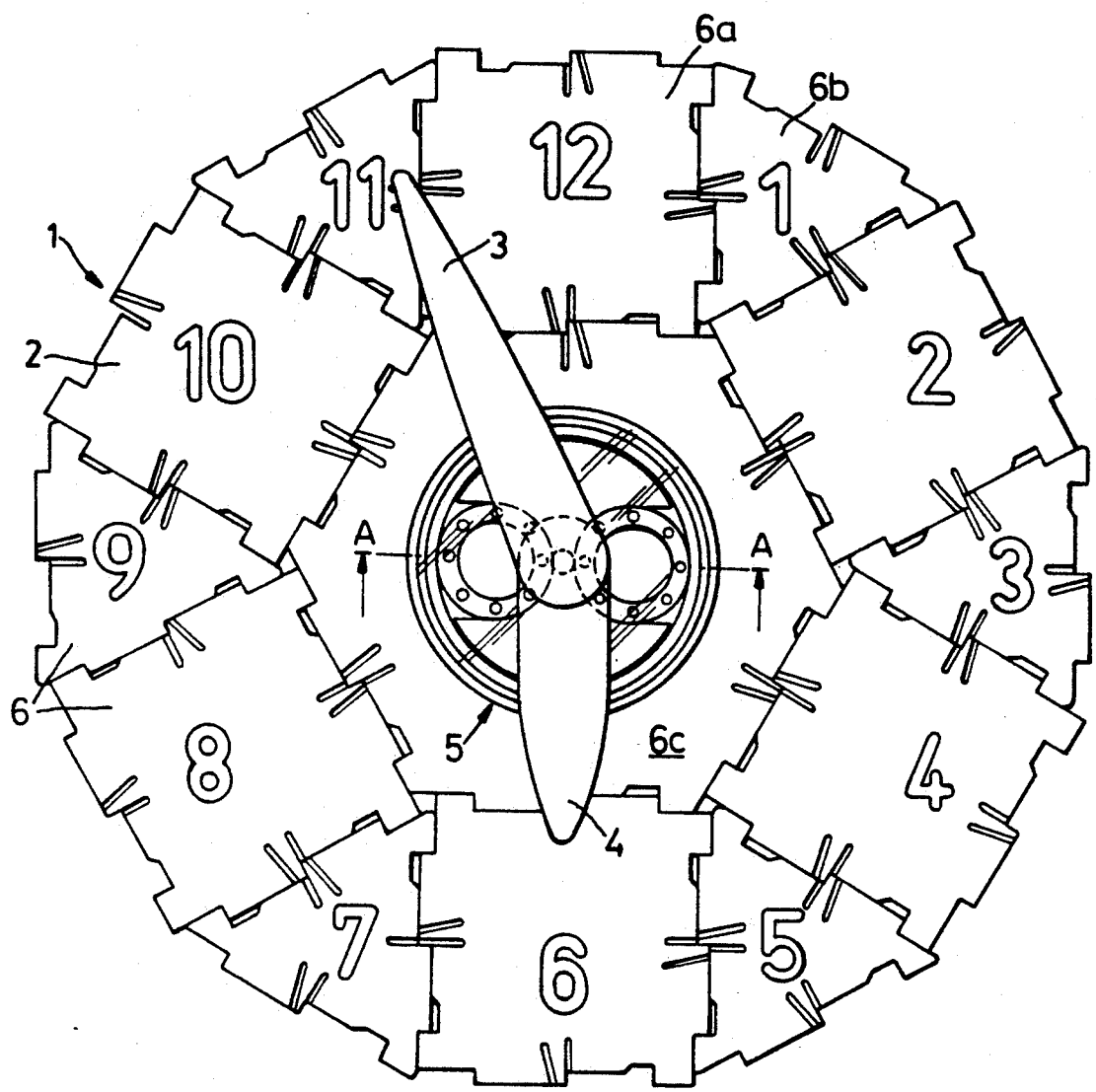

United States Patent [19]

Harvey

[11] Patent Number: 5,322,486
[45] Date of Patent: Jun. 21, 1994

[54] EPICYCLIC CHANGE-SPEED MECHANISM AND MODEL CLOCK INCORPORATING SAME

[76] Inventor: Edward H. Harvey, 3 Church-End Cottages, Bletchingdon, Oxon, United Kingdom

[21] Appl. No.: 13,715

[22] Filed: Feb. 3, 1993

[30] Foreign Application Priority Data

Feb. 4, 1992 [EP] European Pat. Off. .......... 9202283.9

[51] Int. Cl.⁵ .............................................. F16H 1/28
[52] U.S. Cl. ................................... 475/183; 475/902
[58] Field of Search ................................. 475/183, 902

[56] References Cited

U.S. PATENT DOCUMENTS

| | | | |
|---|---|---|---|
| 1,701,723 | 2/1929 | Lyons | 475/183 |
| 2,966,070 | 12/1960 | Wise | 475/183 |
| 3,254,546 | 6/1966 | Nasvytis | 475/183 |
| 3,267,771 | 8/1966 | Bugg | 475/183 |
| 4,922,790 | 5/1990 | Abbott et al. | 475/183 |

*Primary Examiner*—Dirk Wright
*Attorney, Agent, or Firm*—Edward A. Sokolski

[57] ABSTRACT

The invention provides an epicyclic change-speed mechanism comprising a fixed outer ring having an inwardly directed running surface, a spider member mounted within the outer ring and rotatable about an axis concentric with the axis of the outer ring, the spider member having a hollow output shaft concentric with said outer ring, an input shaft concentric with the outer ring, and at least one planet wheel contained within an aperture in the spider member, the or each planet wheel being in driven engagement with the input shaft and in rolling engagement with the running surface of outer ring.

The invention also provides a model clock incorporating the change-speed mechanism, the face of the clock being formed from interfitting pieces of a constructional toy.

20 Claims, 2 Drawing Sheets

EPICYCLIC CHANGE-SPEED MECHANISM AND MODEL CLOCK INCORPORATING SAME

This invention relates to an epicyclic change-speed mechanism and to a model or teaching clock incorporating same.

The invention has as its object to provide an epicyclic change-speed mechanism which has a minimum of shafts and bearings, few moving parts and which is simple and cheap to manufacture, e.g. from synthetic plastics material.

Furthermore, according to an embodiment of the invention, the change-speed mechanism is completely free of gear teeth which might be stripped or damaged and can act as a slipping clutch, thus making it particularly useful for use in childrens' toys or models which may be subject to rough handling, such as a model or teaching clock where a child might try to forcibly move the hands in opposite directions.

According to the present invention there is provided an epicyclic change-speed mechanism comprising a fixed outer ring having an inwardly directed running surface, a spider member mounted within said outer ring and rotatable about an axis concentric with the axis of said outer ring, the spider member having a hollow output shaft concentric with said outer ring, an input shaft concentric with said outer ring and at least one planet wheel contained within an aperture in said spider member whereby the only driving engagement between the at least one planet wheel and the spider member is through the outer periphery of the at least one planet wheel, said at least one planet wheel being in driven engagement with said input shaft and in rolling engagement with said running surface of said outer ring.

Said at least one planet wheel may be an interference-fit between said input shaft and said running surface.

Although, if desired, the running surface of said outer ring, the outer circumferential surface of said at least one planet wheel and the outer surface of said input shaft in contact with the outer circumferential surface of said at least one planet wheel could comprise intermeshing teeth or be ribbed, roughened or otherwise formed to increase the frictional resistance therebetween, they are according to an embodiment of the invention all smooth whereby the mechanism will act as a slipping clutch if said output shaft is subjected to more than a predetermined amount of resistance.

Preferably the mechanism of the present invention comprises two planet wheels each contained within an aperture in said spider member, said planet wheels being located on diametrically opposite sides of said input shaft, although it could, if desired, comprise only a single planet wheel or could comprise three planet wheels each contained in an aperture in said spider member and equally spaced around said input shaft.

The or each said planet wheel may be in the form of an annular ring which can elastically deform slightly as a result of said interference fit.

Clearance may be provided between the running surface of said outer ring and the spider member.

The or each said planet wheel may be loosely contained with clearance within a said aperture in the spider member.

The mechanism of the present invention may comprise a housing defining a recess and a cover member closing said recess, said outer ring being within said recess and fast with said housing, e.g, integral therewith, and said spider member and said at least one planet wheel being retained in said recess by said cover member.

Said input shaft may be journalled in said housing and in said hollow output shaft, and said output shaft, and hence said spider member, may be journalled in said cover member.

The cover member may be an interference or snap fit with said housing or may be screwed, adhered, welded or otherwise secured thereto.

The input shaft may taper towards that end thereof journalled in said housing to facilitate assembly of the mechanism.

The different parts of the mechanism of the present invention may be moulded or otherwise formed from a suitable synthetic plastics material, such as ABS (AcrylonitrileButadieneStyrene).

The diameters of the running surface of said outer ring, the outer circumferential surface of said at least one planet wheel and the outer surface of said input shaft in contact with said at least one planet wheel may be so chosen as to give a reduction ratio of 12:1 between said input shaft and said output shaft.

Whilst for convenience of description the input shaft and output shaft have been assigned specific roles, whereby the mechanism will act as a speed reduction mechanism, it will be understood that if desired the roles of these shafts may be reversed so that the output shaft becomes the input shaft and the input shaft becomes the output shaft, whereby the mechanism will act to provide an increase in speed.

According to a further feature of the present invention there is provided a model clock, e.g., for teaching young children to tell the time, which comprises a change-speed mechanism according to the present invention.

The model clock may comprise a minute hand fast with said input shaft and an hour hand on said output shaft and rotatable therewith.

The model clock of the present invention is preferably operable by manually moving said minute hand although, if desired, a motor could be provided for driving said input shaft.

The face of the model clock may be formed from interlocking pieces of a constructional toy, such as that sold under the Registered Trademark "POLYDRON" manufactured by Polydron U.K. Limited of Northampton, England, said pieces being planar and having interfitting side margins which cooperate with a snap fit. Thus, for example, the face of the model clock may comprise alternate substantially square and triangular pieces arranged around a central substantially hexagonal piece, each of said square and triangular pieces having a number representing an hour marked thereon. The housing of said change-speed mechanism may be a friction or snap fit in a central aperture in said hexagonal piece. Said pieces may be moulded or otherwise formed from a suitable synthetic plastics material, such as ABS.

Figure 2:
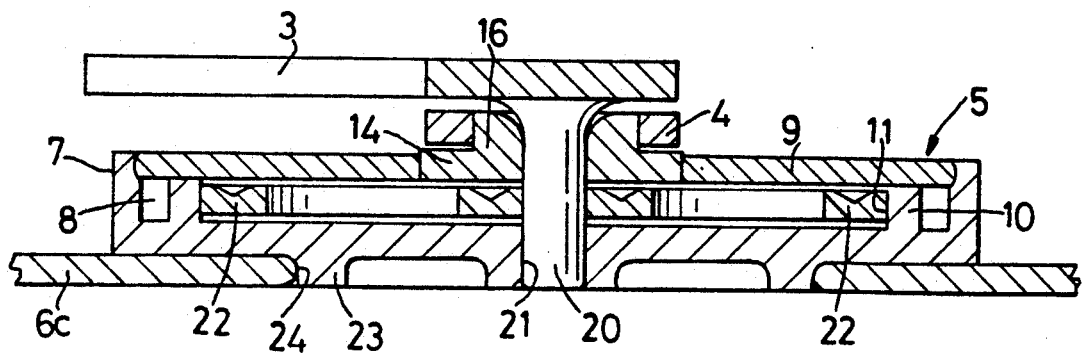
Figure 3:
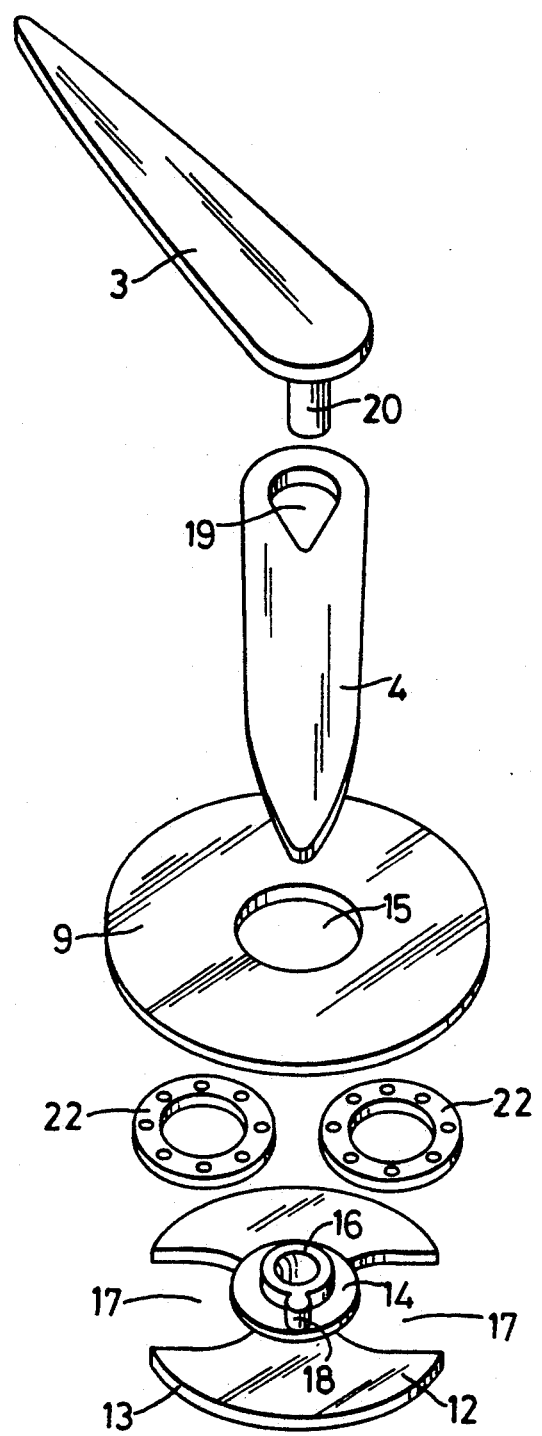

The invention will be more particularly described with reference to the accompanying drawings, in which:

FIG. 1 is a plan view of an embodiment of a model clock according to the present invention incorporating an embodiment of an epicyclic change-speed mechanism also according to the present invention, FIG. 2 is an enlarged fragmentary sectional elevation on the line A—A of FIG. 1, and FIG. 3 is an exploded perspective view on a different scale of the epicyclic change-speed mechanism shown in FIGS. 1 and 2.

Referring to FIG. 1 of the drawings, it will be seen that the model clock 1 illustrated, which is intended for teaching young children to tell the time, comprises a face 2, a minute hand 3, an hour hand 4 and a change-speed mechanism generally indicated at 5 for providing a speed reduction ratio of 12:1 between the minute hand 3 and the hour hand 4. The model clock illustrated is intended to be operated manually by moving the minute hand 3.

The face 2 of the model clock 1 comprises interfitting pieces 6 of a constructional toy sold under the Registered Trademark "POLYDRON", the pieces being planar and having interfitting side margins which cooperate with a snap fit in known manner. As will be seen, the face 2 of the model clock 1 comprises alternate square and triangular pieces 6a, 6b, each having a different number indicating an hour marked thereon, arranged around a central hexagonal piece 6c. With this arrangement the model clock 1 can not only be used for teaching the time but the pieces 6 can also be disassembled and a child given the task of reassembling the pieces 6 with the numbers indicating the hours in the correct position and orientation, thus aiding the learning of numbers, logic and manipulative skills whilst playing.

Referring also now to FIGS. 2 and 3, it will be seen that the epicyclic change-speed mechanism 5 comprises a circular housing 7 defining a shallow recess 8 closed by a cover member 9 which is a friction or snap fit with the housing 7.

Mounted within the recess 8 and integral with the housing 7 is a fixed outer ring 10 having a smooth inwardly directed running surface 11.

A spider member 12 is mounted for rotation in the recess 8 within the outer ring 10, there being a small clearance between the outer periphery 13 of the spider member 12 and the running surface 11 of outer ring 10. Integral with the spider member 12 is a central boss 14 journalled in an aperture 15 in cover member 9 and a hollow output shaft 16 concentric with and upstanding from the boss 14. Spider member 12 further comprises diametrically opposed open-ended slots or apertures 17 (the purpose of which will become apparent hereinafter) and a peg 18 integral with and upstanding from boss 14 adjacent output shaft 16.

Hour hand 4 has a drop-shaped aperture 19 therein which is a press fit over output shaft 16 and peg 18, whereby the hour hand 4 is constrained to rotate with the output shaft 16.

Fixedly secured to or integral with the minute hand 3 is an input shaft 20 journalled for rotation in the hollow output shaft 16 and in a central aperture 21 in the bottom of housing 7.

Loosely mounted within each of the slots or apertures 17 in the spider member 12 is an annular planet wheel 22 which is an interference fit between the running surface 11 of fixed outer ring 10 and the outer periphery of input shaft 20. Preferably, each of the planet wheels 22 is of such a size that it will be deformed very slightly by its contact with the running surface 11 and input shaft 20. Input shaft 20 may taper slightly towards its free end to facilitate assembly of the mechanism and may be retained in position by its driving engagement with planet wheels 22.

The running surface 11 and the contacting outer peripheral surfaces of the planet wheels 22 and input shaft 20 are preferably smooth and free of any gear teeth or other projections as shown, whereby the change-speed mechanism can act as a slipping clutch to prevent damage to the mechanism, e.g., should a child force the minute hand 3 and hour hand 4 in opposite directions.

Projecting outwardly from the underside of housing 7 is a triangular shaped boss 23 which is a friction or snap fit in a complementary aperture 24 in the centre of hexagonal piece 6c.

Constructional toy pieces 6 and the various parts of the change-speed mechanism 5 are preferably formed, e.g. moulded, from a suitable synthetic plastics material such as ABS.

It will be understood that the change-speed mechanism 5 of the present invention has uses other than as a clock mechanism and that if desired the roles of the input shaft 20 and output shaft 16 could be reversed so that the mechanism acts to effect an increase in speed rather than a decrease.

It will also be understood that if desired the change-speed mechanism 5 of the present invention could be designed to be stackable so that two or more such mechanisms could be stacked with the output shaft of one connected to the input shaft of the next to provide an even greater change in speed between an initial input and an eventual output.

From the foregoing it will be apparent that the present invention provides a change-speed mechanism which can be of simple, compact and robust design, which has few moving parts, which can act as a slipping clutch should more than a predetermined resistance be exerted on the output shaft and which can readily be produced by moulding the various parts thereof from a suitable plastics material.

It will also be apparent from the foregoing that the model clock of the invention can be simple but robust and, because it is capable of assembly and disassembly, provides opportunities for play and learning beyond those of a simple teaching clock.

For added interest, the cover member 9 is preferably transparent so that when the minute hand 3 is moved the rolling motion of the planet wheels 22 around the running surface 11 and the rotation of the spider member 12 can be seen.

I claim:

1. An epicyclic change-speed mechanism comprising a fixed outer ring having an inwardly directed running surface, a spider member mounted within said outer ring and rotatable about an axis concentric with the axis of said outer ring, the spider member having a hollow output shaft concentric with said outer ring, an input shaft concentric with said outer ring and at least one planet wheel contained within an aperture in said spider member whereby the only driving engagement between the at least one planet wheel and the spider member is through the outer periphery of the at least one planet wheel, said at least one planet wheel being in driven engagement with said input shaft and in rolling engagement with said running surface of said outer ring.

2. A mechanism according to claim 1, wherein said at least one planet wheel is an interference fit between said input shaft and said running surface.

3. A mechanism according to claim 2, wherein the running surface of said outer ring, the outer circumferential surface of said at least one planet wheel in contact with said running surface and the outer surface of said input shaft in contact with the outer circumferential surface of said at least one planet wheel are all smooth, whereby the mechanism will act as a slipping clutch if said output shaft is subjected to more than a predetermined amount of resistance.

4. A mechanism according to claim 1, comprising two planet wheels each contained within an aperture in said spider member, said planet wheels being located on diametrically opposite sides of said input shaft.

5. A mechanism according to claim 2, wherein the or each planet wheel is in the form of an annular ring which can elastically deform slightly as a result of said interference fit.

6. A mechanism according to claim 1, wherein clearance is provided between the running surface of said outer ring and the spider member.

7. A mechanism according to claim 1, wherein said at least one planet wheel is loosely contained with clearance within a said aperture in the spider member.

8. A mechanism according to claim 1, comprising a housing defining a recess and a cover member closing said recess, said outer ring being within said recess and fast with said housing and said spider member and said at least one planet wheel being retained within said recess by said cover member.

9. A mechanism according to claim 8, wherein said outer ring is integral with said housing.

10. A mechanism according to claim 8, wherein said input shaft is journalled in said housing and in said hollow output shaft, and said output shaft, and hence said spider member, is journalled in said cover member.

11. A mechanism according to claim 8, wherein said cover member is an interference fit with said housing.

12. A mechanism according to claim 1, wherein the different parts are moulded from synthetic plastics material.

13. A mechanism according to claim 12, wherein the synthetic plastics material is ABS.

14. A model clock comprising:
(a) an epicyclic change-speed mechanism consisting of a fixed outer ring having an inwardly directed running surface, a spider member mounted within said outer ring and rotatable about an axis concentric with the axis of said outer ring, the spider member having a hollow output shaft concentric with said outer ring, an input shaft concentric with said outer ring and at least one planet wheel contained within an aperture in said spider member whereby the only driving engagement between the at least one planet wheel and the spider member is through the outer periphery of the at least one planet wheel, said at least one planet wheel being in driven engagement with said input shaft and in rolling engagement with said running surface of said outer ring;
(b) the diameters of the running surface of said outer ring, the outer circumferential surface of said at least one planet wheel and the outer surface of said input shaft in contact with said at least one planet wheel being so chosen as to give a reduction ratio of 12:1 between said input shaft and said output shaft; and
(c) a minute hand fast with said input shaft and an hour hand on said output shaft and rotatable therewith.

15. A model clock according to claim 14, operable by manually moving said minute hand.

16. A model clock according to claim 14, comprising two planet wheels each contained within an aperture in said spider member, said planet wheels being located on diametrically opposite sides of said input shaft.

17. A model clock according to claim 14, wherein the running surface of said outer ring, the outer circumferential surface of said at least one planet wheel in contact with said running surface and the outer surface of said input shaft in contact with the outer circumferential surface of said at least one planet wheel are all smooth, whereby the mechanism will act as a slipping clutch if said output shaft is subjected to more than a predetermined amount of resistance.

18. A model clock according to claim 14, wherein the face of the clock is formed from interlocking pieces of a constructional toy.

19. A model clock according to claim 14, wherein the face of the clock is formed from interlocking pieces of a constructional toy comprising alternate substantially square and substantially equilateral triangular pieces arranged around a central substantially hexagonal piece, each of said square and triangular pieces having a number representing an hour, marked thereon, said pieces being planar and having interfitting side margins which cooperate with a snap fit.

20. A model clock according to claim 19, wherein:
(a) said change-speed mechanism comprises a housing defining a recess and a cover member closing said recess, said outer ring being within said recess and fast with said housing and said spider member and said at least one planet wheel being retained within said recess by said cover member, said input shaft being journalled in said housing and in said hollow output shaft, and said output shaft being journalled in said cover member, and
(b) said housing of the change-speed mechanism is a friction fit in a central aperture in said hexagonal piece.

* * * * *